(12) United States Patent
Wijetunga

(10) Patent No.: US 11,777,546 B2
(45) Date of Patent: Oct. 3, 2023

(54) RECEIVER WITH IMPROVED NOISE IMMUNITY

(71) Applicant: Rambus Inc., San Jose, CA (US)

(72) Inventor: Panduka Wijetunga, Thousand Oaks, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/742,679

(22) Filed: May 12, 2022

(65) Prior Publication Data
US 2022/0385320 A1    Dec. 1, 2022

Related U.S. Application Data

(60) Provisional application No. 63/193,963, filed on May 27, 2021.

(51) Int. Cl.
| | | |
|---|---|---|
| *H04M 1/00* | (2006.01) | |
| *H04B 1/10* | (2006.01) | |
| *H04B 1/12* | (2006.01) | |

(52) U.S. Cl.
CPC ......... *H04B 1/1027* (2013.01); *H04B 1/1018* (2013.01); *H04B 1/12* (2013.01)

(58) Field of Classification Search
CPC ....... H04B 1/1018; H04B 1/1027; H04B 1/12
See application file for complete search history.

(56) References Cited

U.S. PATENT DOCUMENTS

| | | | | |
|---|---|---|---|---|
| 6,087,816 A | * | 7/2000 | Volk | H02M 3/1582 323/222 |
| 6,580,258 B2 | * | 6/2003 | Wilcox | H02M 3/1588 323/272 |
| 6,799,233 B1 | | 9/2004 | Deshpande et al. | |
| 6,801,069 B1 | | 10/2004 | Livolsi et al. | |
| 7,433,426 B2 | | 10/2008 | Zhu et al. | |
| 8,390,383 B2 | * | 3/2013 | Hara | H03G 3/3084 330/141 |
| 8,508,297 B2 | * | 8/2013 | Honda | H03F 1/0222 330/297 |
| 9,806,700 B2 | | 10/2017 | Iguelmamene | |
| 10,848,147 B2 | | 11/2020 | Rizvi et al. | |

(Continued)

OTHER PUBLICATIONS

Wikipedia, "Hysteresis," Retrieved from "https://en.wikipedia.org/w/index.php?title=Hysteresis&oldid=1013969237" and last edited on Mar. 24, 2021, at 13:18 (UTC), 17 pages.

(Continued)

*Primary Examiner* — Nhan T Le
(74) *Attorney, Agent, or Firm* — Silicon Edge Law Group LLP; Arthur J. Behiel

(57) ABSTRACT

A binary receiver combines a fast amplifier with a relatively slow amplifier for noise rejection. Both the fast and slow amplifiers employ hysteresis. The fast amplifier has relatively lower hysteresis, meaning that its sensitivity is a less effected by prior data values but more susceptible to glitch-induced errors. Conversely, the slow amplifier has relatively higher hysteresis and rejects glitches but introduces undesirable signal-propagation delays. A state machine taking input from both amplifiers allows the receiver to filter glitches without incurring a significant data-propagation delay.

20 Claims, 2 Drawing Sheets

(56) References Cited

U.S. PATENT DOCUMENTS 11,342,849 B2 * 5/2022 Cohen .................... H02M 1/32

OTHER PUBLICATIONS

Wikipedia, "I2C," Retrieved from "https://en.wikipedia.org/w/index.php?title=I$_2$C&oldid=1019929433" and last edited on Apr. 26, 2021, at 06:08 (UTC), 15 pages.
Wikipedia, "I3C (Bus)," Retrieved from "https://en.wikipedia.org/w/index.php?title=I3C_(bus)&oldid=1016305389" and last edited on Apr. 6, 2021, at 13:25 (UTC), 8 pages.
Wikipedia, "Schmitt Trigger," Retrieved from "https://en.wikipedia.org/w/index.php?title=Schmitt_trigger&oldid=1023171911" and last edited on May 14, 2021, at 20:06 (UTC), 11 pages.

* cited by examiner

RECEIVER WITH IMPROVED NOISE IMMUNITY

BACKGROUND

Digital signals represent data as a sequence of symbols that each represent a discrete value. This contrasts with analog signals, which represent data across a continuum. The following discussion relates to binary signals, digital signals that represent data with only two values, commonly represented as zero and one.

Binary signals represent zeros and ones as bands of analog levels. For example, voltage levels below some reference level may represent a logic zero and above the reference level a logic one. Inadvertent changes to the signal can be disregarded so long as the voltage level remains within the respective low and high ranges. Information can thus be transmitted without error.

Binary signals cannot transition between high and low ranges instantaneously, and not all such transitions are a function of the communicated data. Various types of noise and circuit imperfections can induce erroneous transitions and thus introduce errors in the digital data. For example, wires that extend between integrated circuits to communicate binary signals can introduce reflections of signal transitions that appear as "glitches" at the receiver. A glitch that appears at an inopportune instant can be misperceived as a data transition, and thus introduce an error.

A form of binary communication is defined by a specification called MIPI I3C, which details an electrical connection between integrated-circuit devices. The MIPI I3C connection includes two wires, one that conveys a binary data signal and another that conveys a clock signal for timing receipt of the data signal at the recipient device. In general, the data symbol can transition between one and zero after a falling edge of the clock signal so that the new value can be sampled on the next rising edge. Signal reflections induce glitches that can cause errors, particularly at higher data rates. As in myriad other digital circuits, receivers that comply with the MIPI I3C standard should be simple, inexpensive, efficient, fast, and error free.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

An architecture for a binary receiver combines a fast amplifier for speed performance with a slow amplifier for noise rejection, "fast" and "slow" being relative to one another. Both the fast and slow amplifiers employ hysteresis, which means that their sensitivity to changes in the received signal depends upon the history of that signal. Between the two, the fast amplifier has lower hysteresis, meaning that its sensitivity is less effected by prior data values but more susceptible to glitch-induced errors. Conversely, the slow amplifier has relatively higher hysteresis and thus rejects glitches but introduces undesirable signal-propagation delays. A state machine taking input from both amplifiers allows the receiver to offer the advantages of each, filtering glitches without incurring a significant data-propagation delay.

Figure 1:
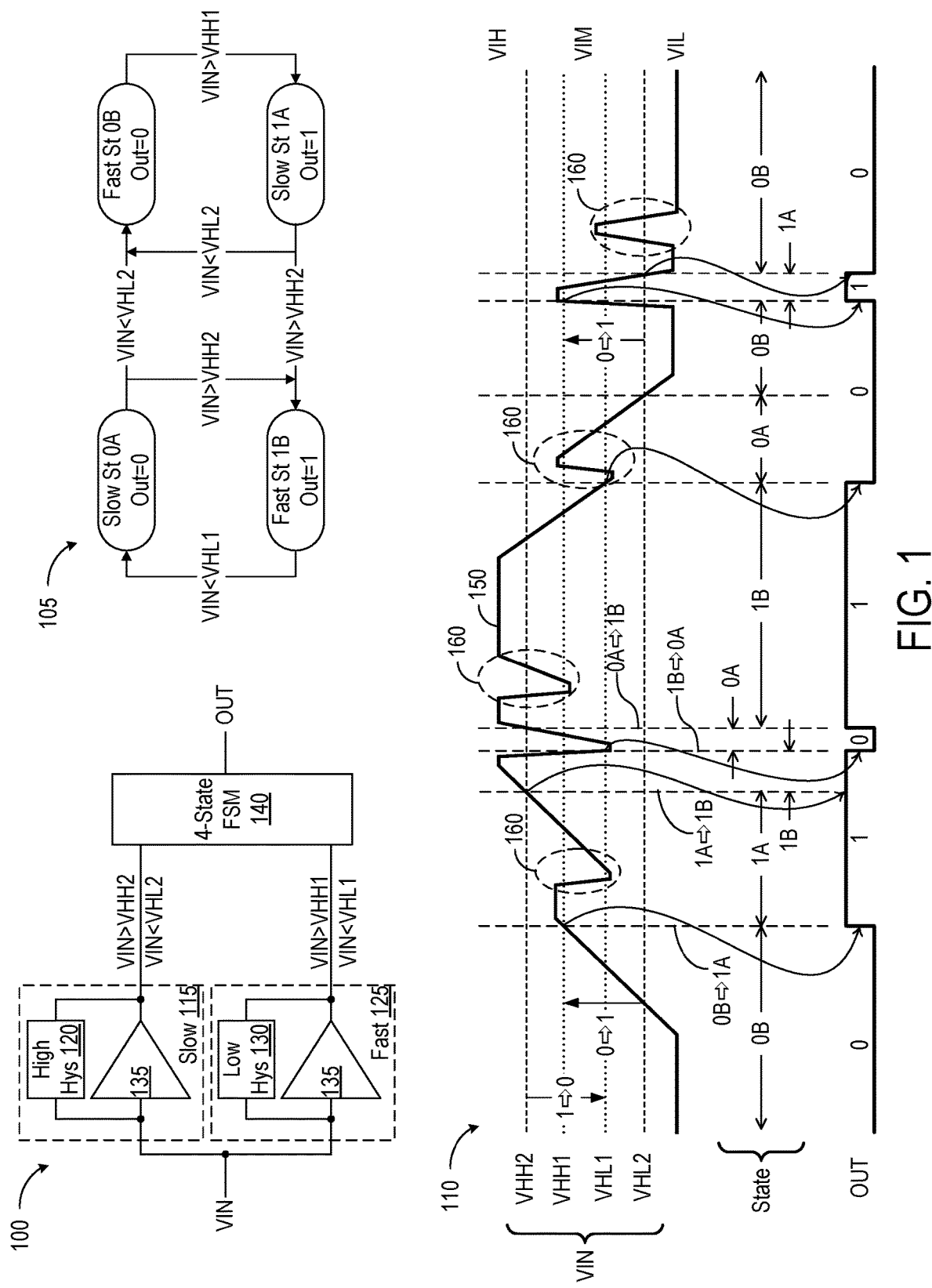
FIG. 1 depicts a receiver 100, a state diagram 105 for receiver 100, and a timing diagram 110 illustrating the operation of receiver 100.

FIG. 1 depicts a receiver 100 for recovering a binary, digital output signal OUT from a voltage-modulated input signal VIN expressing a series of input symbols, each symbol expressed as a voltage within a range representative of either a first digital value (logic zero) or a second digital value (logic one). FIG. 1 additionally includes a state diagram 105 and a timing diagram 110 illustrating the operation of receiver 100 in accordance with one embodiment.

Receiver 100 includes a first amplifier 115 that amplifies input signal VIN while applying a first, relatively high hysteresis feedback transfer function (HFTF) 120 of its output to input signal VIN. A second amplifier 125 likewise amplifies signal VIN while applying a second, relatively low HFTF 130 of its output to input signal VIN. HFTFs 120 and 130 reduce the output switching speeds of respective amplifiers 115 and 125. The higher hysteresis provided by HFTF 120 is a stronger function of the output of amplifier 115 than lower hysteresis provided by HFTF 130 is of the output of amplifier 125. The output of amplifier 115 is thus slower to react to fluctuations of signal VIN than is the output of amplifier 125. Each of amplifiers 115 and 125 applies its respective hysteresis feedback to an input of a comparator 135, e.g. by adding the feedback to signal VIN or subtracting the feedback from a reference against which signal VIN is compared.

The outputs from amplifiers 115 and 120 stimulate a finite-state machine (FSM) 140 to transition between the four states illustrated in state diagram 105 to produce binary output signal OUT. State machine 140 sets output signal OUT to zero in two states 0A and 0B and to one in two states 1A and 1B.

Turning to timing diagram 110, input signal VIN is depicted as a trace 150 that transitions between extreme input levels VIL (voltage in, low) and VIH (voltage in, high) and around a middle level VIM (voltage in, mid). Output signal OUT is depicted as a binary trace 155 that transitions between a low value representative of a binary value of zero and a high level representative of a binary value of one. Input trace 150 includes glitches 160 that are not meant to communicate data. By selectively employing alternative levels of hysteresis, receiver 100 is able to quickly transition output signal OUT responsive to changes in signal VIN while disregarding glitches 160.

The relatively high hysteresis of high HFTF 120 is represented in timing diagram 110 as voltage levels VHH2 and VHL2. For the output of the slow, high-hysteresis amplifier 115 to switch from low to high, voltage VIN must rise above level VHH2; for the output of amplifier 115 to switch from high to low, voltage VIN must drop below level VHL2. For the output of the relatively fast, low-hysteresis amplifier 125 to similarly transition, voltage VIN must rise above level VHH1 or fall below level VHL1. Higher hysteresis means that levels VHH2 and VHL2 are more different than levels VHH1 and VHL1, and thus that the output of amplifier 115 is slower to change responsive to input signal VIN than is the output of amplifier 125.

The following discussion moves between state diagram 105 and timing diagram 110 to illustrate the operation of receiver 100. Beginning at the left of the timing diagram, signal VIN is at the bottom of its range and state machine 140 is in state 0B outputting a logic zero as output signal OUT. State 0B is a "fast" state, meaning the receiver 100 makes relatively fast decisions in this state. The way to transition out of state 0B is to detect a fast, low-hysteresis transition via amplifier 125. When signal VIN rises above level VHH1, state machine 140 transitions from state 0B to state 1A (0B→1A), raising output signal OUT to a level indicative of a logic one. State 1A is a "slow" state, meaning the receiver 100 makes relatively slow decisions in this state. The way to transition out of state 1A is to detect a slow, high-hysteresis transition via amplifier 115. Two high-hysteresis transitions are possible from state 1A, as input signal VIN can either rise above level VHH2 or fall below level VHL2. In the example of diagram 110, signal VIN rises above level VHH2 so state machine 140 transitions to fast state 1B (1A→1B) and maintains output signal OUT at logic one. Had signal VIN instead fallen below level VHL2, state machine 140 would have transitioned back to fast state 0B and output signal OUT would have returned to zero.

State machine 140 only transitions from fast state 1B if signal VIN falls below level VHL1, at which point state machine 140 transitions to slow state 0A (1B→0A) and switches output signal OUT to logic zero. As in slow state 1A, two high-hysteresis transitions are possible from slow state 0A. In the example of diagram 110, signal VIN rises above level VHH2 so state machine 140 transitions to fast state 1B (0A→1B) and raises output signal OUT to logic one. Had signal VIN instead fallen below level VHL2, state machine 140 would have instead transitioned to fast state 0B and output signal would have remained at zero.

The remaining transitions of timing diagram 110 proceed according to state diagram 105, with each state transition moving between fast and slow states. The fast states (0B and 1B) allow output signal OUT to respond quickly to changes in input signal VIN, but each fast state is only arrived at via a slow state that applies a relatively high level of hysteresis to filter out glitches. Receiver 100 thus benefits from the speed of amplifier 125 and the glitch tolerance of amplifier 125.

The values of levels VHH2, VHL2, VHH1, and VHL1 are adjustable in some embodiments, allowing receiver 100 to be calibrated during e.g. a boot cycle that optimizes for some tradeoff between efficiency and performance. In a low-noise environment, some of receiver 100 can be disabled to save power. For example, state machine 140 might be limited to fast states 0B and 1B and rely on only amplifier 125 for state transitions. The remaining amplifier 115 can be disabled. Registers, not shown, can be loaded during calibration to configuration receiver 100.

Figure 2:
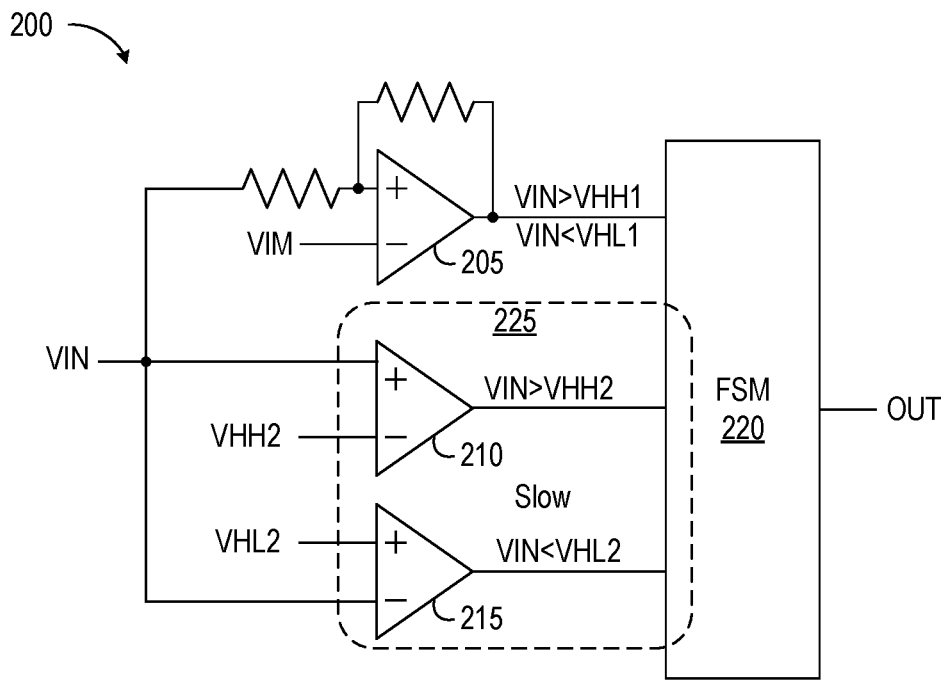
FIG. 2 depicts a receiver 200 in accordance with another embodiment.

FIG. 2 depicts a receiver 200 in accordance with another embodiment. Receiver 200 includes three comparators 205, 210, and 215, amplifiers that amplify input signal VIN with respect to a respective reference level and feed a resultant binary decision to a finite state machine (FSM) 220. Comparator 205 is equipped with positive feedback that applies the relatively low level of hysteresis of the fast states of FIG. 1. This configuration, commonly known as a Schmitt trigger, offers relatively fast and power-efficient switching but with somewhat poor control that can exacerbate glitch sensitivity. Comparators 210 and 215 may be of a less efficient and more precise configuration, but the circuitry can run at a lower slew rate for reduced power consumption. Comparators 210 and 215 do not themselves apply hysteresis feedback in this example but FSM 220 saves the states of their outputs or signal OUT so that transitions from slow states are dependent upon transitions from comparator 210 and 215 rather than the only the current values of their outputs. Comparators 210 and 215, with state information in FSM 220, can be thought of as a single amplifier 225 that applies the relatively high level of hysteresis of the slow states of FIG. 1. The HFTFs are simple, linear functions in this embodiment but other linear and nonlinear functions can be used.

Figure 3:
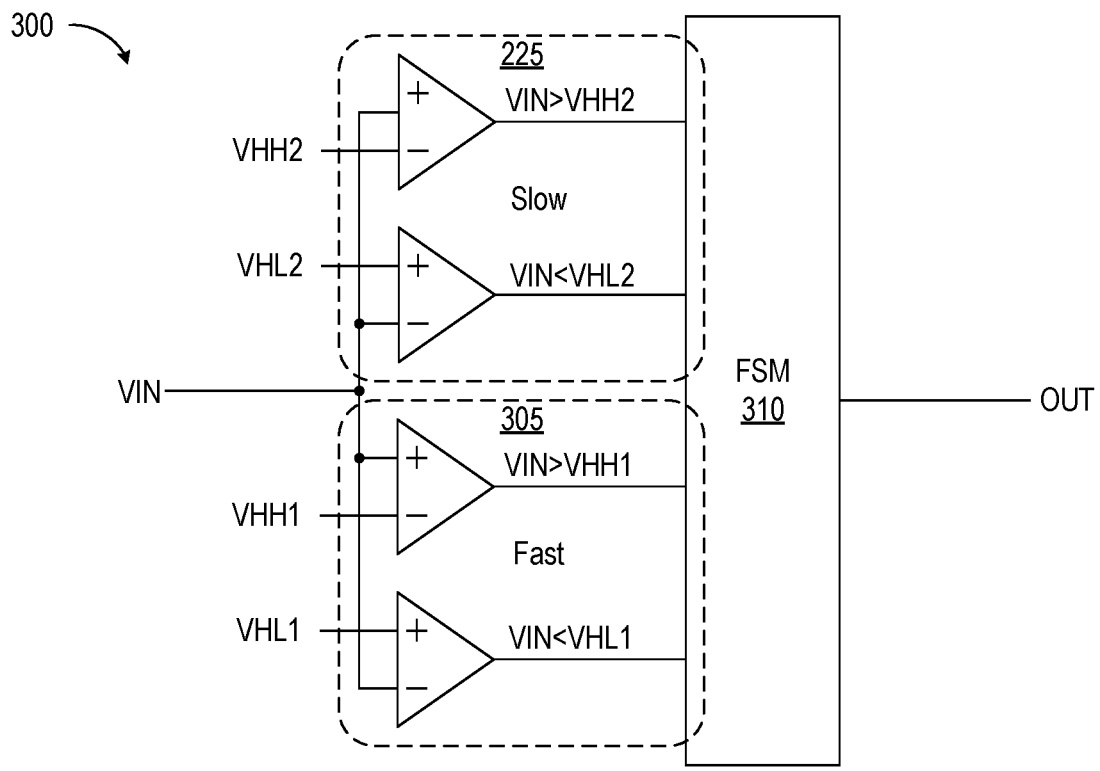
FIG. 3 depicts a receiver 300 in accordance with yet another embodiment.

FIG. 3 depicts a receiver 300 in accordance with another embodiment. Relatively slow, high-hysteresis amplification is provided by amplifier 225 of FIG. 2 using reference levels VHH2 and VHL2; relatively fast, low-hysteresis amplification is provided by a similar amplifier 305 that uses reference levels VHH1 and VHL1 that are more closely spaced. An FSM 310 produces output signal OUT as a function of the output levels from amplifiers 225 and 305, including their prior states, to transition as illustrated in state diagram 105 of FIG. 1.

In the foregoing description and in the accompanying drawings, specific terminology and drawing symbols have been set forth to provide a thorough understanding. In some instances, the terminology and symbols may imply specific details that are not required. The term "coupled" is used herein to express a direct connection as well as a connection through one or more intervening circuits or structures. Moreover, while the receivers detailed above communicate binary signals using four states, other embodiments support additional states to communicate digital signals using more than two levels.

While the subject matter has been described in connection with specific embodiments, other embodiments are also envisioned. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A receiver to produce a binary output signal from an input signal, the receiver comprising:
    a state machine to represent the binary output signal as a first binary value in a first state and a second state, and to represent the binary output signal as a second binary value in a third state and a fourth state;
    a first amplifier to apply a first hysteresis feedback transfer function of the binary output signal to the input signal; and
    a second amplifier to apply a second hysteresis feedback transfer function of the binary output signal to the input signal, the second hysteresis feedback transfer function a stronger function of the binary output signal than the first hysteresis feedback transfer function;
    the state machine to transition from the first state to the second state, and from the third state to the fourth state, responsive to the second amplifier.

2. The receiver of claim 1, the state machine to transition from the second state to the third state and from the fourth state to the first state responsive to the first amplifier.

3. The receiver of claim 2, wherein the state machine transitions from the second state to the third state responsive to a first binary value from the first amplifier and from the fourth state to the first state responsive to a second binary value from the first amplifier.

4. The receiver of claim 1, the state machine to transition from the first state to the second state responsive to a first binary value from the second amplifier and from the first state to the fourth state responsive to a second binary value from the second amplifier.

5. A receiver for recovering a digital output signal from a series of input symbols, the digital output signal exhibiting a first digital value and a second digital value, the receiver comprising:
- a first amplifier to apply to the input symbols a first hysteresis feedback transfer function of the output signal;
- a second amplifier to apply to the input symbols a second hysteresis feedback transfer function of the output signal, the second hysteresis feedback transfer function a stronger function of the output signal than the first hysteresis feedback transfer function;
- a state machine to transition between states responsive to the first amplifier and the second amplifier, the state machine having:
  - a first state to output the first digital value;
  - a second state to output the first digital value;
  - a third state to output the second digital value; and
  - a fourth state to output the second digital value;
- the state machine to transition:
  - from the first state to the second state and from the third state to the fourth state responsive to the second amplifier; and
  - from the second state to the third state and from the fourth state to the first state responsive to the first amplifier.

6. The receiver of claim 5, wherein the first hysteresis feedback transfer function is a linear function of the output signal.

7. The receiver of claim 5, wherein the second hysteresis feedback transfer function is a linear function of the output signal.

8. The receiver of claim 5, wherein at least one of the first amplifier and the second amplifier comprises a Schmitt trigger.

9. The receiver of claim 5, wherein the first amplifier comprises a Schmitt trigger and the second amplifier comprises a first comparator to compare the input symbols to a first reference level and a second comparator to compare the input symbols to a second reference level.

10. A method of recovering a digital output signal from a series of input symbols, the method comprising:
- applying a low hysteresis feedback transfer function of the output signal to the input symbols to make fast decisions;
- applying a high hysteresis feedback transfer function of the output signal to the input symbols to make slow decisions, the high hysteresis feedback transfer function greater than the low hysteresis feedback transfer function;
- in a first slow state,
  - outputting a first value of the digital output signal;
  - ignoring the fast decisions; and
  - transitioning to a first fast state responsive to one of the slow decisions.

11. The method of claim 10, further comprising:
- in the first fast state;
  - outputting the first value of the digital output signal; and
  - transitioning to a second slow state responsive to a one of the fast decisions.

12. The method of claim 11, further comprising outputting a second value of the digital signal in the second slow state.

13. The method of claim 12, wherein the slow decisions are of a first decision type and a second decision type, the method further comprising, in the second slow state, ignoring the fast decisions and transitioning to the first fast state responsive to one of the slow decisions of the first decision type.

14. The method of claim 12, wherein the slow decisions are of a first decision type and a second decision type, the method further comprising, in the second slow state, ignoring the fast decisions and transitioning to a second fast state responsive to one of the slow decisions of the second decision type.

15. The method of claim 14, further comprising, in the second fast state, transitioning to the first slow state responsive to one of the fast decisions.

16. The method of claim 10, wherein the low hysteresis feedback transfer function is linear.

17. The method of claim 16, wherein the high hysteresis feedback transfer function is linear.

18. The method of claim 10, wherein applying at least one of the low hysteresis feedback transfer function and the high hysteresis feedback transfer function comprises applying adding to the input symbols.

19. The method of claim 10, further comprising comparing the input symbols to a reference, wherein applying at least one of the low hysteresis feedback transfer function and the high hysteresis feedback transfer function comprises subtracting from the reference.

20. The method of claim 10, wherein the digital output signal is a binary signal.

* * * * *